(12) United States Patent
Zhang

(10) Patent No.: US 12,721,273 B2
(45) Date of Patent: Sep. 1, 2026

(54) FRUIT STEM REMOVAL APPARATUS

(71) Applicant: DAXO Industries, Inc., Philadelphia, PA (US)

(72) Inventor: Jiahao Zhang, Philadelphia, PA (US)

(73) Assignee: Daxo Industries, Inc., Philadelphia, PA (US)

( * ) Notice: Subject to any disclaimer, the term of this patent is extended or adjusted under 35 U.S.C. 154(b) by 368 days.

(21) Appl. No.: 18/459,333

(22) Filed: Aug. 31, 2023

(65) Prior Publication Data

US 2025/0072328 A1 Mar. 6, 2025

(51) Int. Cl.
*A01D 46/247* (2006.01)

(52) U.S. Cl.
CPC .................................. *A01D 46/247* (2013.01)

(58) Field of Classification Search
CPC .......... A01D 46/00; A01D 1/00; A01D 46/24; A01D 46/243; A01D 46/247; A01G 2003/023; A01G 3/021; A01G 3/02; A23N 15/02
See application file for complete search history.

(56) References Cited

U.S. PATENT DOCUMENTS

| | | | | |
|---|---|---|---|---|
| 2,206,790 | A | 7/1940 | Read et al. | |
| 3,857,227 | A | 12/1974 | Rosenberg | |
| 5,857,316 | A | 1/1999 | Murdock | |
| 2022/0174864 | A1* | 6/2022 | Toner | B26D 5/00 |

FOREIGN PATENT DOCUMENTS

| | | | |
|---|---|---|---|
| CN | 114451144 | * | 5/2022 |
| JP | 5839384 | B2 | 1/2016 |
| JP | 2020178600 | * | 11/2020 |

* cited by examiner

*Primary Examiner* — Michael McCullough
(74) *Attorney, Agent, or Firm* — Stanzione & Associates, PLLC; Patrick Stanzione

(57) ABSTRACT

A fruit stem removal apparatus that enables hands free fruit stem clipping of all types of fruits. The fruit stem removal apparatus includes a body with two flexible arms which can be pushed downward and toward each other simultaneously by pressing a piece of fruit on the arms such that a blade on one of the arms cuts a stem off the fruit.

10 Claims, 6 Drawing Sheets

FRUIT STEM REMOVAL APPARATUS

STATEMENT REGARDING FEDERALLY SPONSORED RESEARCH OR DEVELOPMENT

Not applicable

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71 (d).

BACKGROUND OF THE INVENTIVE CONCEPT

1. Field of the Invention

The present inventive concept relates to a fruit stem removal apparatus. More particularly, but not exclusively, this inventive concept relates to a fruit stem removal apparatus that enables hands free fruit stem clipping of all types of fruits to improve efficiency of fruit picking processes.

2. Description of the Related Art

As fruit pickers walk through orchards and other areas where fruits grow they are required to pick the fruits from the trees or bushes with their hands. After the fruit is picked from the tree or bush, the stems of these picked fruits must be removed for further processing of the fruit and to prevent fruit damage from stem punctures during storage and packaging of the fruit. There are many different types of stem removal devices on the market. However, most stem removal devices require being held in one hand of the picker while the other hand of the picker picks the fruit. Moreover, in order to clip the stems from the picked fruit the picker must hand the fruit in one hand and remove the stem with the other hand. This process requires time for the picker to stop picking fruit from the tree/bush to remove the stems and place the de-stemmed fruit in a bag before picking another fruit from the tree/bush. Conventional stem removal devices are described below.

U.S. Pat. No. 5,857,316 by Murdock discloses a manual stem cutting and fruit removal apparatus 10. This apparatus 10 includes a receptacle member 12 having a mouth 16 and a cutting assembly 19. The cutting assembly 19 includes a blade holder 42 and a pair of blades 40 formed in a Y-shape. Here a piece of fruit must be inserted into the receptable member 12 and then slid to a position beneath the cutting assembly 19. Then a forceful backward motion of the apparatus 10 is required to force a stem of the fruit between the two blades 40 to sever the stem from the fruit. This apparatus 10 is large and bulky, and requires a significant number of steps to capture a piece of fruit and remove the stem. Moreover, two hands are required to hold this apparatus 10 up to a piece of fruit on a tree and forcefully pull the entire apparatus 10, by its handle 15, in a backward direction to remove the stem.

U.S. Pat. No. 3,857,227 by Rosenberg discloses a cutter head for picking fruit on a tree. This cutter 10 is supported on an elongated rod 11. The cutter head 10 includes a pair of overlying plates 12 and 13 disposed in an overlying relationship (see FIGS. 1 and 2) and a cutter 18 including a pair of cutter bars 35. The cutter 10 is actuated by squeezing either an actuator mechanism 17 or 20, both disposed along the elongated rod 11. This device requires both hands to grip the rod 11 and/or the actuator mechanisms 17 or 20 while the cutter 10 is raised up to insert a stem of a fruit between the cutter bars 35. When the actuator(s) 17 or 20 are squeezed the cutter bars 35 are pivoted toward each other to cut the stem. With this device both hands are required to raise the cutter 10 up to a piece of fruit while one hand operates an actuator 17 to cut the stem of a fruit.

U.S. Pat. No. 2,206,790 by Read et al. discloses a cutter for picking fruit. Here the cutter requires one finger of each hand of a picker to be inserted through loops 12, 35, respectively. Once the fingers of opposite hands are inserted through the loops 12, 35 the loops 12, 35 must be pushed together to move opposing blades 21, 33 toward each other while a stem is positioned therebetween. The loop and blade pairs 12, 21 and 33, 35 are held together by screws 30, 31 inserted into elongated slots 26, 27, respectively. With this device both hands are required to insert a stem between blades 21, 33 and then slide the blade 21, 33 toward each other while both hands are occupied by fingers being inserted into the loops 12, 35.

JP 5839384B2 discloses a fruit stem cutter 1 including a pair of blade parts 2 which pivot around a pair of parallel support shafts 20 while blade edges 22 face each other. Stopper parts 3 are positioned to support the blade edges 22 such that the opening between the blade edges 22, **22*a* is just larger than the diameter of a fruit stem. The fruit stem is inserted between the pair of blade edges 22, 22*a* and then the fruit stem is pulled upward such that the pair of blade parts 2 turn upward to cut the fruit stem. Here one hand of a user must hold the fruit below the blade parts 2, insert the stem of the fruit between the blade edges 22, 22*a* and then a second hand of the user is required to grab the stem and pull it upward to move the blades edges 22, 22*a*** together to cut the stem.

Accordingly, there is a need for a fruit stem removal apparatus that enables hands-free fruit stem clipping.

There is also a need for a fruit stem removal apparatus that improves efficiency of clipping stems from fruit.

There is also a need for a fruit stem removal apparatus that enables a fruit picker to remove a stem from one piece of fruit while simultaneously picking another piece of fruit off a tree or bush.

There is also a need for a fruit stem removal apparatus that requires only one step to remove a stem from a piece of fruit.

SUMMARY OF THE INVENTIVE CONCEPT

The present general inventive concept provides a fruit stem removal apparatus that enables hands free fruit stem clipping of all types of fruits to improve efficiency of fruit picking processes.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a fruit stem removal apparatus, comprising: an elongated flat base including a first end and a second end; a flexible blade arm attached at a first end thereof to the first end of the base such that a second end thereof extends at an angle upwards in a direction towards a center of the base, the blade arm including a blade removably attached to and extending away from the second end thereof; a flexible stop block arm attached at a first end thereof to the second end of the base such that a second end thereof extends at an angle upwards in a direction towards the center of the base to face a second end of the blade, the stop block arm including a stop block attached thereto to receive the second end of the blade therein when either one of or both the flexible blade arm and the flexible stop block arm is pressed downward toward the base such that the second end of the blade contacts an inner surface of the stop block.

In an exemplary embodiment, the fruit stem removal apparatus can further comprise: a blade mouthpiece removably attached to the second end of the flexible blade arm and including a groove formed therein to attachably receive the first end of the blade, and an alignment protrusion extending outward adjacent to the blade; and a stop block mouthpiece removably attached to the second end of the flexible stop block arm and disposed a predetermined distance from the blade mouthpiece such that a stem of fruit can be inserted therebetween, the stop block mouthpiece including an alignment groove formed therein to receive the alignment protrusion of the blade mouthpiece when either one of or both the flexible blade arm and the flexible stop block arm is pressed downward toward the base, the alignment groove having the stop block formed therein.

In another exemplary embodiment, the flexible blade arm and the flexible stop block arm can include a connection groove and a connection insert formed therein; and the blade mouthpiece and the stop block mouthpiece can each include a groove post and an insert post to be inserted into the connection groove and connection insert of the flexible blade arm and the flexible stop block, respectively, such that after the groove post and insert post are inserted into the respective connection groove and connection insert, the blade mouthpiece and the stop block mouthpiece can be rotated to lock onto the flexible blade arm and flexible stop block arm, respectively.

In another exemplary embodiment, the first and second ends of the elongated flat base can be bent downward such that the flexible blade arm and the flexible stop block arm extend upward and toward each other when first ends thereof are connected thereto, respectively.

In still another exemplary embodiment, the base can further comprise: a stem groove formed into a first side thereof at a middle portion thereof to receive cut stems therethrough; and a vertical edge flange extending upward from a second side thereof to stop cut stems from sliding off the second side thereof.

In still another exemplary embodiment, the base can further comprise a horizontal connection flange disposed at each side of the vertical edge flange, each horizontal connection flange including a clamp removably connected thereto to clamp to an outer perimeter of an opening of a fruit reception bag.

The foregoing and/or other features and utilities of the present general inventive concept may also be achieved by providing a fruit stem removal apparatus, comprising: an elongated flat base including a first end and a second end; a pivotal blade arm attached at a first end thereof to the first end of the base such that a second end thereof extends towards a center of the base, the pivotal blade arm including a blade extending outward from the second end thereof; a pivotal stop block arm attached at a first end thereof to the second end of the base such that a second end thereof extends towards a center of the base to face the blade on the second end of the blade arm, the pivotal stop block arm including a stop block at the second end thereof to receive a portion of the blade therein when either one of or both the pivotal blade arm and the pivotal stop block arm is pivoted downward toward the base such that the blade will make contact with an inner surface of the stop block to cut a stem of a fruit.

In an exemplary embodiment, the fruit stem removal apparatus can also comprise: a first hinge to connect the first end of the base to the first end of the pivotal blade arm; a second hinge to connect the second end of the base to the first end of the pivotal stop block arm; a first spring disposed between a top of the base and a bottom of the pivotal blade arm and a second spring disposed between a top of the base and a bottom of the pivotal stop block arm; at least one first arm stopper extending upward from at least one side of the base and bending above the pivotal blade arm to limit upward movement of the pivotal blade arm; and at least one second arm stopper extending upward from at least one side of the base and bending above the pivotal stop block arm to limit upward movement of the pivotal stop block arm.

In another exemplary embodiment, the fruit stem removal apparatus can also comprise a brush extending from a first side of the base and disposed between the first and second arm stoppers to stop cut stems from falling off the first side of the base.

In another exemplary embodiment, the at least one first arm stopper includes two arm stoppers, the two arm stoppers extending from opposite sides of the base, and the at least one second arm stopper includes two arm stoppers, the two arm stoppers extend from opposite sides of the base.

The foregoing and/or other features and utilities of the present general inventive concept may also be achieved by providing a fruit stem removal apparatus, comprising: an elongated flexible flat base including a first end bent upward at an angle to extend toward a center of the base and including a blade removably attached thereto, and a second end bent upward at an angle to extend toward the center thereof and including a stop block configured to face the blade such that when either one of or both the first end and the second end is pressed downward toward the center of the base the blade contacts the stop block.

In an exemplary embodiment, the fruit stem removal apparatus can further comprise: a first mouthpiece removably attached to the first end and including: a groove formed therein to attachably receive the first end of the blade, and an alignment protrusion extending outward adjacent to the blade; and a second mouthpiece removably attached to the second end and disposed a predetermined distance from the first mouthpiece such that a stem of fruit can be inserted therebetween, the second mouthpiece including: an alignment groove formed therein to receive the alignment protrusion of the first mouthpiece when either one of or both the first end and the second end is pressed downward toward the center of the base, the alignment groove having the stop block formed therein.

In another exemplary embodiment, the base can further comprise a stem groove formed into a first side thereof at the center portion thereof to receive cut stems therethrough; and a vertical edge flange extending upward from a second side thereof to stop cut stems from sliding off the second side thereof.

In another exemplary embodiment, the base may further comprise a horizontal connection flange disposed at each side of the vertical edge flange, each horizontal connection flange including a clamp removably connected thereto to clamp to an outer perimeter of an opening of a fruit reception bag.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
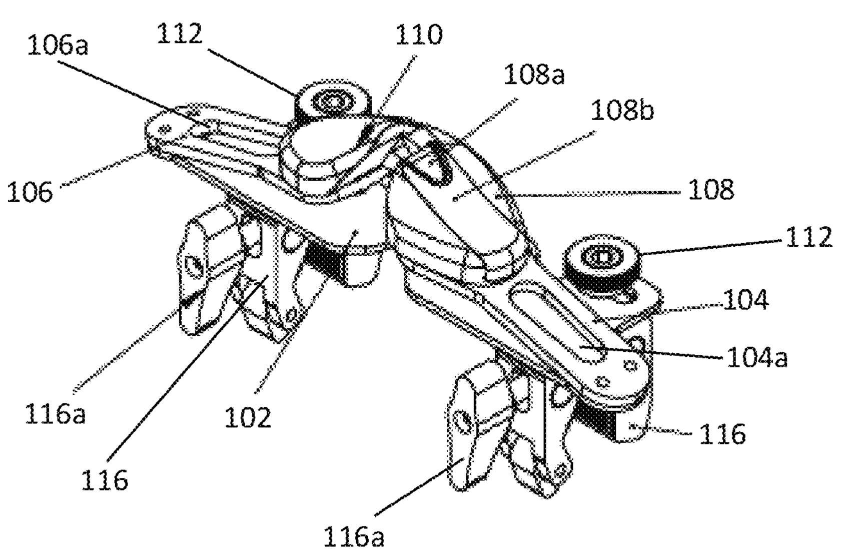
FIG. 1 illustrates a perspective view of a fruit stem removal apparatus, according to an example embodiment of the present inventive concept.

The drawings illustrate a few example embodiments of the present inventive concept, and are not to be considered limiting in scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of the lexicographer, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Hereinafter, one or more example embodiments of the present general inventive concept will be described in detail with reference to the accompanying drawings.

Example embodiments of the present general inventive concept are directed to a fruit stem removal apparatus that enables hands-free fruit stem clipping/removal usable with all types of fruits in order to improve efficiency of fruit picking processes.

Figure 2:
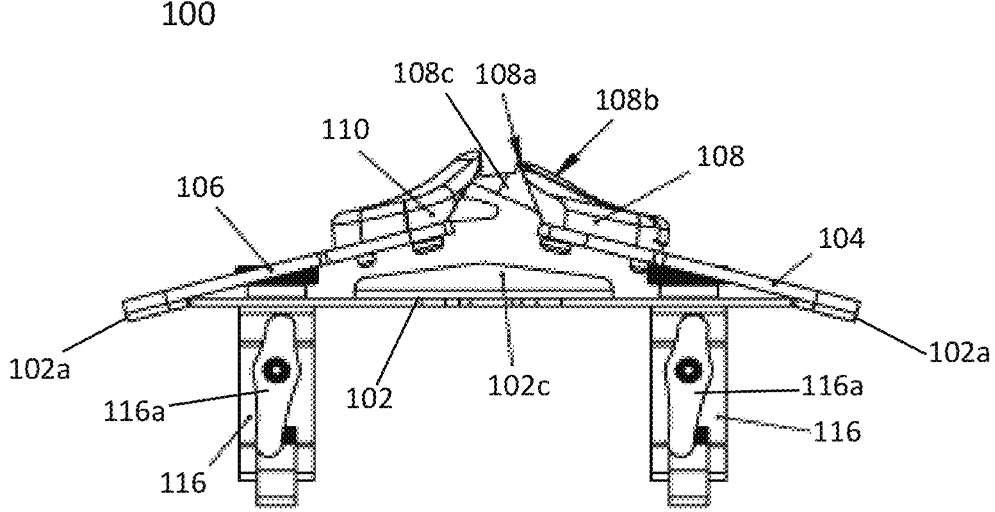
FIG. 2 illustrates a front view of the fruit stem removal apparatus according to the example embodiment of FIG. 1.
Figure 3:
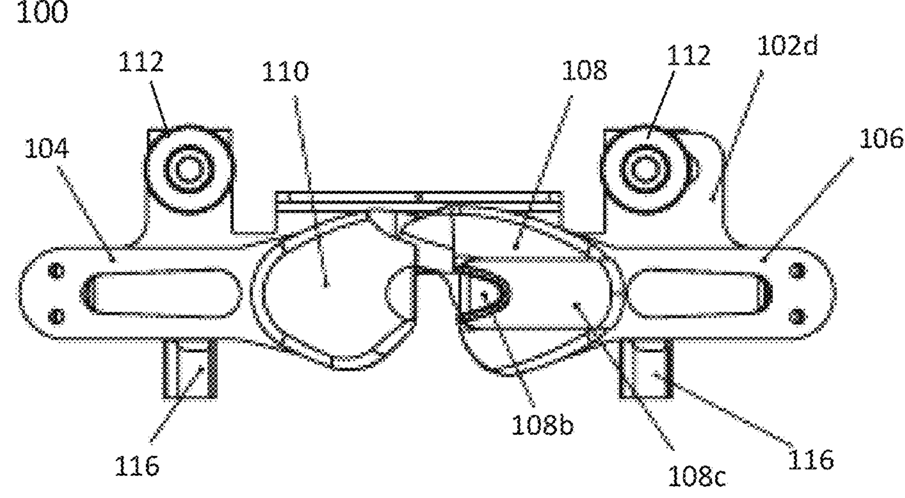
FIG. 3 illustrates a top view of the fruit stem removal apparatus according to the example embodiment of FIG. 1.

FIG. 1 illustrates a perspective view of a fruit stem removal apparatus 100, according to an example embodiment of the present inventive concept, FIG. 2 illustrates a front view of the fruit stem removal apparatus 100 according to the example embodiment of FIG. 1, and FIG. 3 illustrates a top view of the fruit stem removal apparatus 100 according to the example embodiment of FIG. 1. Referring to FIGS. 1-3, the fruit stem removal apparatus 100 according to this example embodiment includes a base 102 in which all parts attach thereto. The fruit stem removal apparatus 100 can include a first side which provides a flexible blade arm 104 including a blade mouthpiece 108 attached at a first end thereof to house a blade 108*a*. The blade 108*a* can be enclosed over the blade mouthpiece 108 by a blade cover 108*b*. The fruit stem removal apparatus 100 can also include a second side which provides a flexible stop block arm 106 comprising a stop block mouthpiece 110 attached at a first end thereof. The stop block mouthpiece 110 is configured to limit downward movement of the flexible blade arm 104 and blade mouthpiece 108. Further, both mouthpieces 108 and 110 work act to limit downward movement of the other one of the mouthpieces as well as to align the mouthpieces 108 and 110. More specifically, when one of the mouthpieces 108, 110 is pressed downwards, the other one of the mouthpieces 108,100 will follow by being forced downwards by the one mouthpiece 108,110 being pressed downwards. The blade arm 104 and the stop block arm 106 can be formed of a flexible metal, such as, for example a stainless steel, Ultem®, polyetherimide (PEI), or a polyoxymethylene (POM), which will provide a spring action when pressed downward. In an alternative embodiment the base 102 can be formed of a flexible material and the flexible blade arm 104 and the flexible stop block arm 106 can be integral extensions thereof. In this example embodiment both the flexible blade arm 104 and the flexible stop block arm 106 can be portions of the base 102 which are bent upward at an angle to extend toward the center of the base 102.

As illustrated in FIG. 2, the base 102 can include first and second arm attachment wings 102*a*. The first and second arm attachment wings 102*a* are preferably integrally formed with the base 102 to extend from opposite ends of the base 102 and are bent downward from the main body portion of the base 102. The first and second arm attachment wings 102*a* are configured to attach to a second end of the flexible blade arm 104 and a second end of the flexible stop block arm 106, respectively. The base 102 can be attached to at least one connection clamp 116 via a screw 112, such that the at least one clamp 116 can connect the fruit stem removal apparatus 100 to a picking bag (not illustrated for brevity of the detailed description). The picking bag is used to receive the picked fruit therein after the fruit stem is removed by the fruit stem removal apparatus 100. The base 102 can also include a vertical edge flange 102*c*, which is bent upward to prevent stems from falling into the picking bag after the stems are removed from the fruit by the blade 108*a*.

Figure 4:
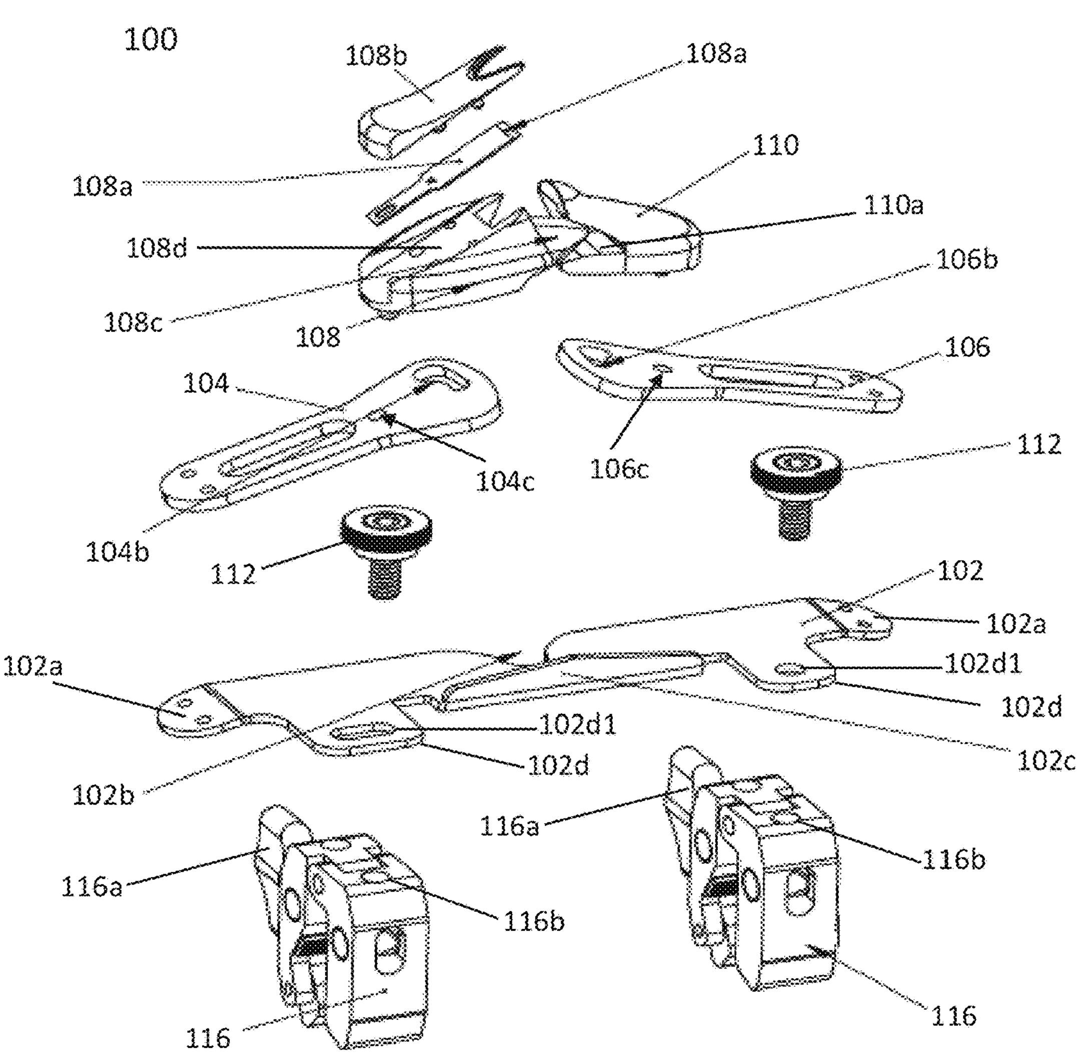
FIG. 4 illustrates an exploded view of the fruit stem removal apparatus according to the example embodiment of FIG. 1.

FIG. 4 illustrates an exploded view of the fruit stem removal apparatus 100 according to the example embodiment of FIG. 1. A more detailed description of each of the parts of the fruit stem removal apparatus 100, and operations thereof, is provided below with reference to FIG. 4.

Referring to FIG. 4, the base 102 can be made from a flat metal plate, such as, for example stainless steel, or other rigid material. The base 102 can include the first and second downward bent arm attachment wings 102*a* extending from opposite ends thereof, a stem groove 102*b* formed at a center portion thereof, a vertical edge flange 102*c* bent upward, and a horizontal connection flange 102*d* extending outward and disposed at each side of the vertical edge flange 102*c*. The first and second arm attachment wings 102*a* are configured to bend downward such that when the second end of the blade arm 104 and the second end of the stop block arm 106 are attached to respective ones of the first and second arm attachment wings 102*a* the first ends of the blade arm 104 and the stop block arm 106 will extend upward to form a triangular shape, as illustrated in FIGS. 2 and 4. The second end of the blade arm 104 and the second end of the stop block arm 106 can be attached to the first and second arm attachment wings 102*a*, respectively, via welding, glue, rivets, or any other equivalent means of attachment which will perform the intended purpose of securing the blade arm 104 and the stop block arm 106 to the base 102. The blade arm 104 and the stop block arm 106 can each include connection grooves 104*b*, 106*b*, respectively, and connection inserts 104*c*, 106*c*, respectively, for purposes of which are described in more detail below with reference to FIGS. 6A-6B.

Figure 6A:
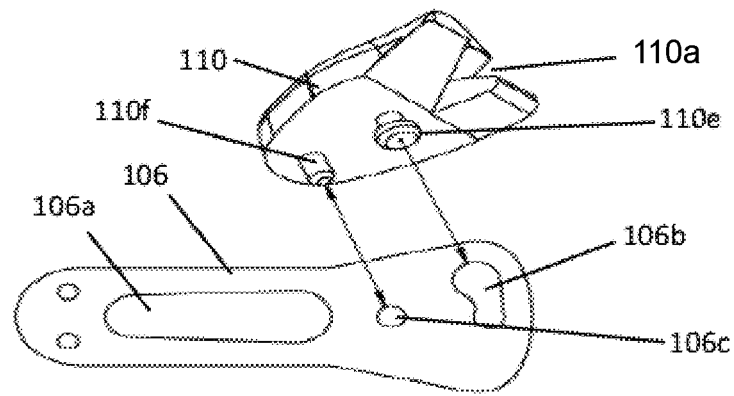
FIG. 6A illustrates an unassembled view of a mouthpiece and stop block arm combination of the fruit stem removal apparatus according to the example embodiment of FIG. 1.
Figure 6B:
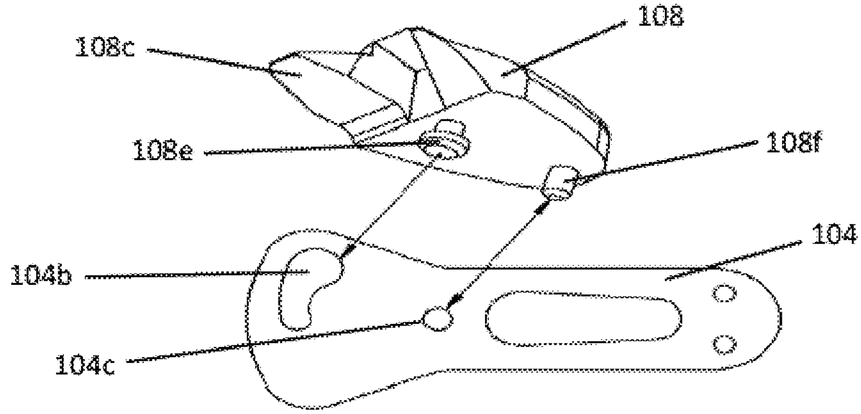
FIG. 6B illustrates an unassembled view of a mouthpiece and blade arm combination of the fruit stem removal apparatus according to the example embodiment of FIG. 1

FIG. 6A illustrates an unassembled view of a stop block mouthpiece 110 and stop block arm 106 combination of the fruit stem removal apparatus 100, according to the example embodiment of FIG. 1, in order to provide a detailed description of an assembly of the stop block arm 106 to the stop block mouthpiece 110. FIG. 6B illustrates an unassembled view of the blade mouthpiece 108 and blade arm 104 combination of the fruit stem removal apparatus 100, according to the example embodiment of FIG. 1.

Referring to FIGS. 6A and 6B, the connection grooves 104*b*, 106*b* are preferably formed to have a wider side and a more narrow side (i.e., kidney shaped), generally referred to as a "rotational slide-and-lock" mechanism, which is described in more detail below. Each of the blade mouthpiece 108 and the stop block mouthpiece 110 can include a mouthpiece groove post 108*e*, 110*e*, respectively, and a mouthpiece insert post 108*f*, 110*f*, respectively. The mouthpiece groove posts 108*e*, 110*e* and the mouthpiece insert posts 108*f*, 110*f* are configured to be inserted into the connection grooves 104*b*, 106*b*, respectively, and a connection insert 104*c*, 106*c*, respectively. More specifically, the mouthpiece groove posts 108*e*, 110*e* should be inserted into the wider side of the connection inserts 104*c*, 106*c*, respectively. The connection inserts 104*c*, 106*c* are designed to have a diameter approximately the same as a diameter of outer ends of the mouthpiece groove posts 108*e*, 110*b*. A middle section of the mouthpiece groove posts 108*e*, 110*e* have a smaller diameter than the outer ends thereof such that once the mouthpiece groove posts 108*e*, 110*e* are inserted into the wider sides of the connection grooves 104*b*, 106*b*, respectively and the mouthpiece insert posts 108*f*, 110*f* are inserted into the connection inserts 104*c*, 106*c*, respectively, the mouthpieces 108 and 110 can be slightly rotated such that the middle section of the mouthpiece groove posts 108*e*, 110*e* will tightly fit into the more narrow side of the connection grooves 104*b*, 106*b*, respectively, removably securing the mouthpieces 108 and 110 to the respective blade arm 104 and the stop block arm 106. More specifically, middle passages on the connection grooves 104*b*, 106*b* can be slightly narrower than the middle section of the groove posts 108*e*, 110*e* such that when the groove posts 108*e*, 110*e* are inserted into the respective connection grooves 104*b*, 106*b* and then rotated there will be a slight resistance due to the narrower passage. After the middle sections of the groove posts 108*e*, 110*e* reach the end of the passage of the respective connection grooves 104*b*, 106*b* the openings on the connection grooves 104*b*, 106*b* can be the same size as the middle sections of the groove posts 108*e*, 110*e* to lock the groove posts 108*e*, 110*e* in place. With this configuration both mouthpieces 108 and 110 can be replaced with new ones in the case of damage or wear.

Each of the horizontal connection flanges 102*d* can include a hole 102*d*1 formed therethrough to receive a respective screw 112. After the screws 112 are inserted through respective ones of the holes 102*d*1 the screws 112 can be threaded into a threaded hole 116*b* formed in a respective one of the connection clamps 116 to secure the connection clamps 116 to the base 102.

Referring back to FIG. 4, the blade mouthpiece 108 can include a slot 108*d* extending along a length of a top portion thereof to receive the blade 108*a* therein and a blade cover 108*b* to secure the blade 108*a* to the blade mouthpiece 108. The blade 108*a* and slot 108*d* can each include one or more holes therein to receive one or more respective posts extending from the bottom of the blade cover 108*b* to removably secure the blade 108*a* and blade cover 108*b* to the top of the blade mouthpiece 108. Preferably the posts extending from the blade cover 108*c* are configured to press-fit into respective ones of the holes formed in the blade mouthpiece 108, or can be glued or heat staked, etc. Once the blade mouthpiece 108 and the stop block mouthpiece 110 are secured to the blade arm 104 and stop block arm 106, respectively, a blade mouthpiece alignment protrusion 108*c* will align with a stop block mouthpiece alignment groove 110*a* such that when either one of the mouthpieces 108, 110 are pressed down the other one of the mouthpieces 108, 110 will be pressed down synchronously to ensure the two mouthpieces 108, 110 always align when a fruit is pushed down on the fruit stem removal apparatus 100. Both upper surfaces of the mouthpieces 108, 110 can have a curved shape to guide the "stem bowl" portion of certain fruits so the stem of the fruit will be centered on the fruit stem removal apparatus 100 for an accurate stem cutting by the blade 108*a*. The upper surfaces of the mouthpieces 108, 110 can be configured to receive the center of the stem area of any types of fruits.

When the blade arm 104 and stop block arm 106 are pushed down by a piece of fruit the corresponding mouthpieces 108 and 110 move toward the base 102 while also moving toward each other to generate a squeeze action therebetween. FIG. 3 illustrates a top view of the fruit stem removal apparatus 100 to illustrate that the two mouthpieces 108, 110 form a funnel shaped opening in the top side of the apparatus, while the other sides of the mouthpieces form a closed condition. With this configuration targeting of the fruit and stem is enabled since a user can easily slide a stem of a fruit into the opening on the top side while a stopping surface is provided on the other side to enable the stems to be cut at the correct place. The opening at the top side can be placed on either side of the fruit stem removal apparatus 100 depending on the preference of the picker. For example, having the opening on the picker side provides better visual cues, while having the opening on the other side can enable more fluid motion while providing less visual cues.

Figure 5:
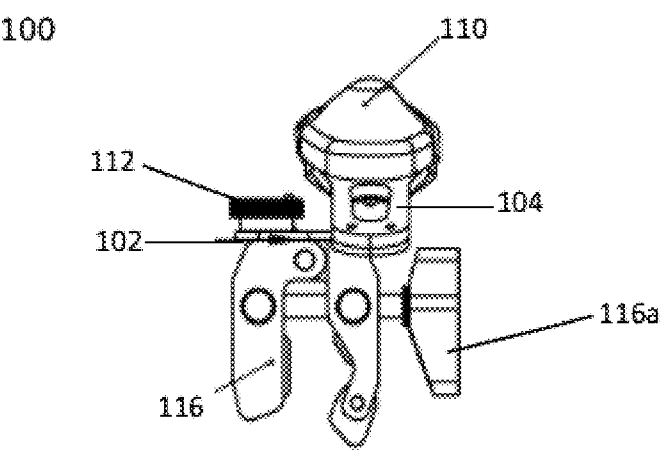
FIG. 5 illustrates a side view of the fruit stem removal apparatus according to the example embodiment of FIG. 1.

FIG. 5 illustrates a side view of the fruit stem removal apparatus according to the example embodiment of FIG. 1. As illustrated in FIG. 5, the mouthpieces 108, 110 form an inverted “V” shape space directly underneath the cutting blade 108*a*, which provides for accommodating thicker stems of fruits by preventing the two mouthpieces 108, 110 from squeezing on the stem instead of cutting the stem. It is to be noted that the mouthpieces 108, 110 can be customized to fit any size, shape, surface hardness and/or any other properties of different fruit varieties, without departing from the spirit and scope of the overall present inventive concept as described herein.

Referring back to FIGS. 1-2 and 4, the mouthpieces 108, 110 have a sloping design in the top surfaces to guide the fruit stem during cutting action. As the two mouthpieces 108, 110 close due to the force of a fruit being pushed down on them, the sloping design will push the stem towards the center of the blade 108*a* to perform an accurate cutting action on the stem. The blade mouthpiece alignment protrusion 108*c* and the stop block mouthpiece alignment groove 110*a* cause the two mouthpieces 108, 110 to interlock when pressed down, which causes the cutting blade 108*a* and the cutting surface within the stop block mouthpiece alignment groove 110*a* to meet and perform a correct cutting action. Further, the two mouthpieces 108, 110 conform to the shape of the surface around the fruit stems such that when a fruit is pushed with its stem facing down towards the base 102 the surface around the stem will automatically guide the two mouthpieces 108, 110 to slide and close to perform a correct cut of the stem. The design of the mouthpieces 108, 110 also causes a “click” sound when a stem is cut as a result of the sudden contact between the two mouthpieces 108, 110, thus providing feedback to the picker that the stem has been successfully cut. This click sound helps to inform the fruit picker as to whether the fruit requires clipping at all since fruits with short stems will not produce any sound since the stem is too short to be clipped, thus resulting in fruit picking efficiency improvement.

The mouthpieces 108, 110 can be made of a soft material to provide a cushion for the fruit being de-stemmed. For example, the mouthpieces 108, 110 can include an elastomer such as, for example, silicone or rubber molded thereon to prevent fruit skins from damage when placed in contact with the mouthpieces 108, 110.

The cutting blade 108*a* can have different shapes which will provide the intended purpose of cutting the stems off fruits in which the fruit stem removal apparatus 100 is desired to be used for. Furthermore, depending on the fruit variety and stem characteristics, the thickness, hardness and other properties of the blade 108*a* can be varied without departing from the spirit and scope of the present inventive concept.

As a result of the positioning of the clamps 116 attached to the fruit stem removal apparatus 100 the stem groove 102*b* of the base will be positioned to extend past the edge of a picking bag in which it is attached, thus causing the removed stems to drop outside the range of the picking bag. Also, the horizontal connection flange 102*d* will prevent any removed stems that may not fall through the stem groove 102*b* from sliding across the surface of the base 102 and falling into the picking bag.

According to another example embodiment of the present inventive concept, the fruit stem removal apparatus 100 may be welded to a metal circumferential ring around the outer perimeter of a picking bag, thus eliminating the requirement of the use of clamps 116 to connect the fruit stem removal apparatus 100 to a fruit picking bag.

FIG. 6A illustrates an unassembled view of a mouthpiece and stop block arm combination of the fruit stem removal apparatus according to the example embodiment of FIG. 1, and FIG. 6B illustrates an unassembled view of a mouthpiece and blade arm combination of the fruit stem removal apparatus according to the example embodiment of FIG. 1.

Figure 7:
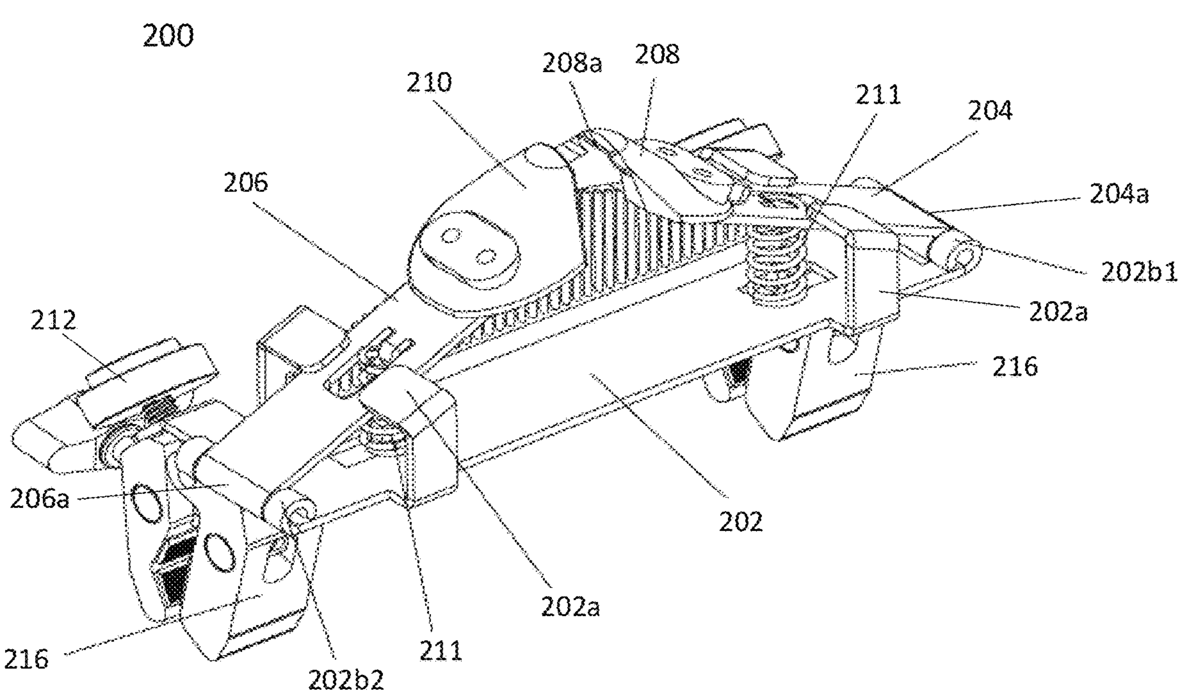
FIG. 7 illustrates a perspective view of a fruit stem removal apparatus, according to another example embodiment of the present inventive concept.
Figure 8:
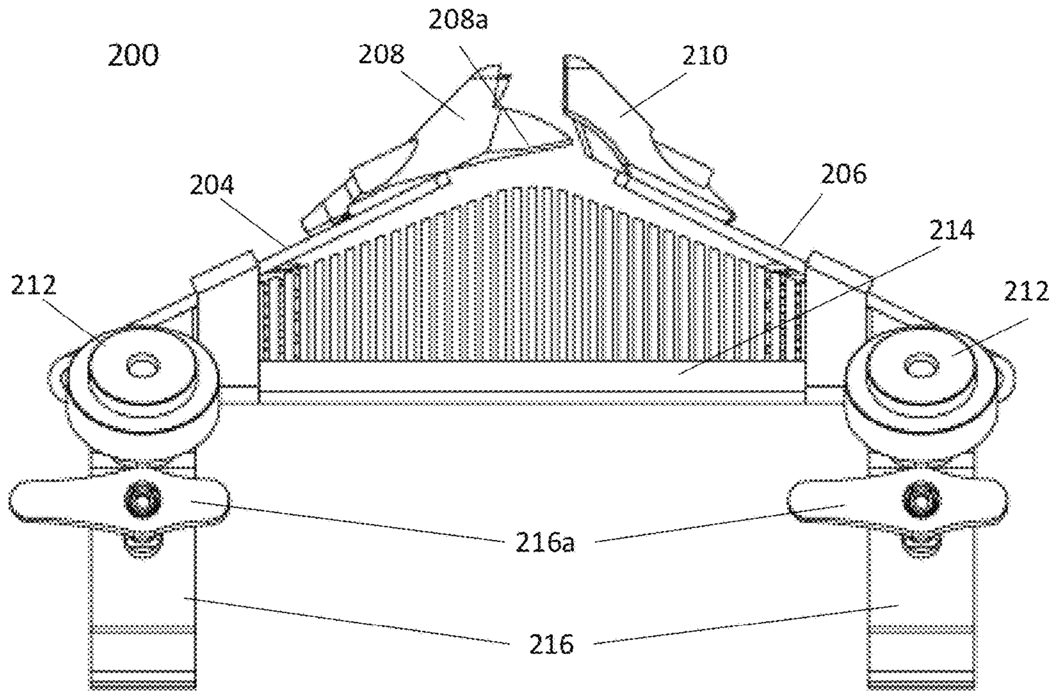
FIG. 8 illustrates a front view of the fruit stem removal apparatus according to the example embodiment of FIG. 7.

FIG. 7 illustrates a perspective view of a fruit stem removal apparatus 200 according to another example embodiment of the present inventive concept, and FIG. 8 illustrates a front view of the fruit stem removal apparatus 200 according to the example embodiment of FIG. 7. Referring to FIGS. 7 and 8, the fruit stem removal apparatus 200 according to this example embodiment includes a base 202 designed with several variations from the fruit stem removal apparatus 100 according to previous example embodiment. For example, the base 202 according to this example embodiment includes an arm stopper 202*a* disposed at equidistant positions to the left and to the right from a center portion thereof. Each arm stopper 202*a* includes a pair of arms which extend upward from opposite sides of the base 202 and then extend inward toward each other. Each arm stopper 202*a* is configured to limit an upward movement of a respective hinged blade arm 204 and hinged stop arm block 206. The base 202 also can include a first hinge part 202*b*1 formed at a first end thereof and a second hinge part 202*b*2 formed at a second end thereof. The first hinged part 202*b*1 connects to a corresponding hinge part 204*a* formed on a first end of the blade arm 204 and the second hinge part 202*b*2 connects to a corresponding hinge part 206*a* formed on a first end of the hinged blade arm 206.

Figure 9:
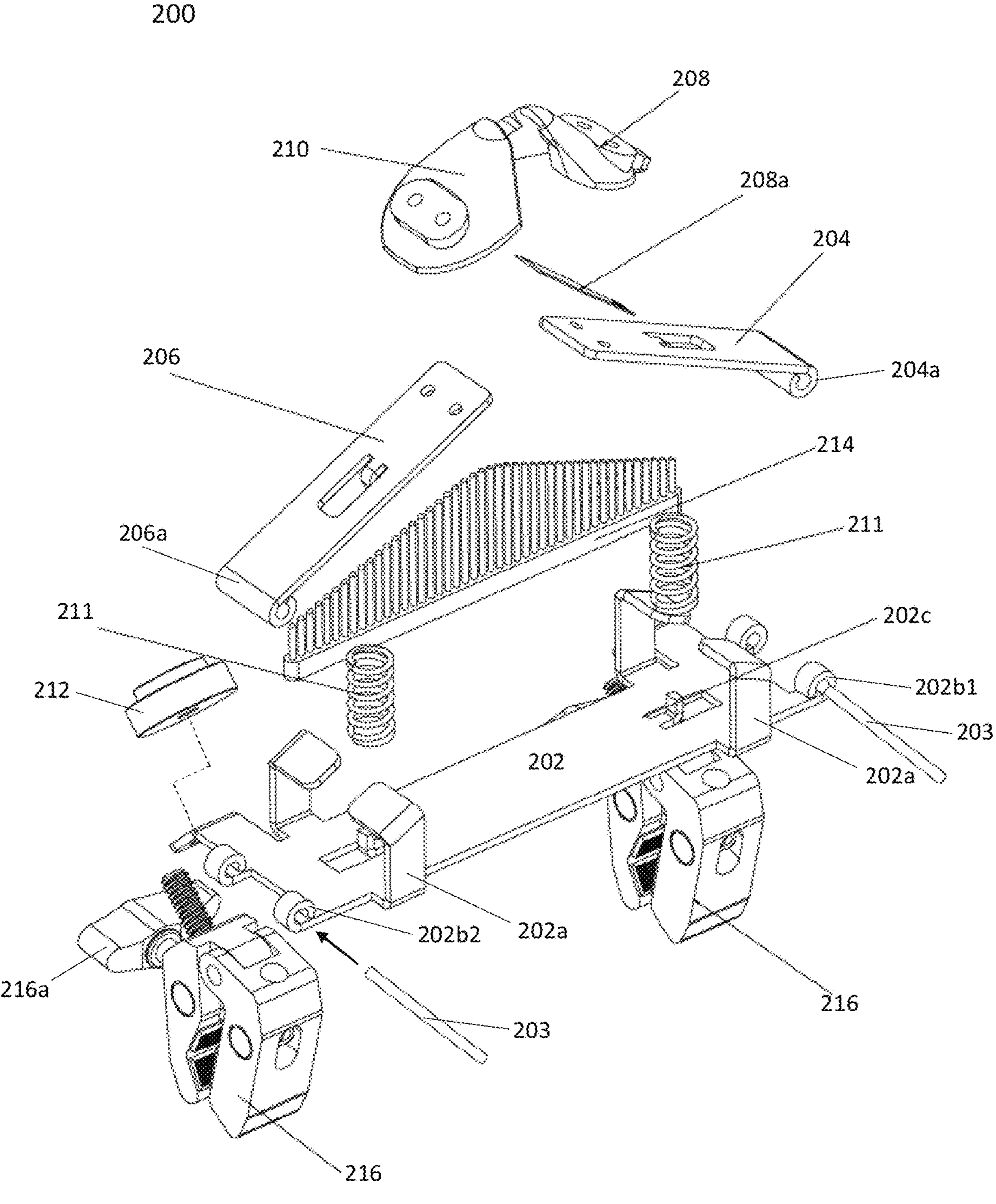
FIG. 9 illustrates an exploded view of the fruit stem removal apparatus according to the example embodiment of FIG. 7.

The first hinge part 202*b*1 of the base 202 can be connected to the corresponding hinge part 204*a* of the blade arm 204 with a hinge pin 203 (see FIG. 9) and the second hinge part 202*b*2 of the base 202 can be connected to the corresponding hinge part 206*a* with another pin 203 (see FIG. 9). The base 202 can also include a spring engagement part 202*c* disposed directly under each of the arm stoppers 202*a*. Each spring engagement part 202*c* is configured to engage with and retain a corresponding spring 211 to remain seated upright directly under a respective hinged blade arm 204 and hinged stop block arm 206. With these configurations the hinged blade arm 204 will be rotatable between the corresponding arm stopper 202*a* and the corresponding spring 211 and the hinged stop block arm 206 will be rotatable between the corresponding arm stopper 202*a* and the corresponding spring 211. The springs 211 will enable both the hinged blade arm 204 and hinged stop block arm 206 to pivot downward when a fruit is pressed against mouthpieces 208 and 210 fixed to second ends of the hinged blade arm 204 and hinged stop block arm 206, respectively. The mouthpieces 208 and 210 can be similar in design to the mouthpieces 108 and 110 according to the previous example embodiment, and therefore will not be described in detail in order to provide brevity to the detailed description herein.

Attached to one side of the base 202 can be a brush 214 to prevent stems from falling into a picking bag in which the fruit stem removal apparatus 200 can be attached thereto with a pair of clamps 216. Each of the clamps 216 can be attach to the fruit stem removal apparatus 200 with a screw type unit 212, which screws into a corresponding threaded hole (not illustrated) formed in each of the clamps 216. The brush 214 is preferably disposed to stand directly adjacent the hinged blade arm 204 and hinged stop block arm 206 as both the hinged blade arm 204 and hinged stop block arm 206 pivot up and down with respect to the base 202.

Figure 10:
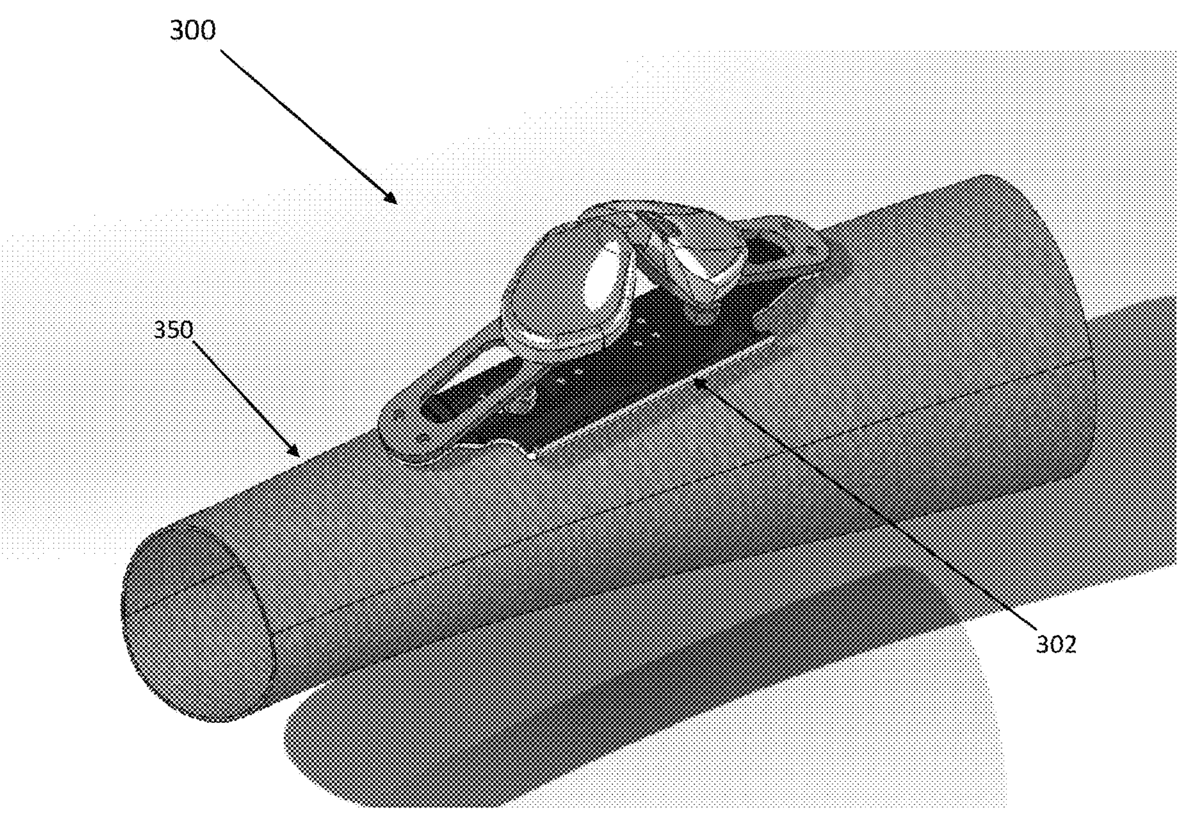
FIG. 10 illustrates another example embodiment of a fruit stem removal apparatus attachable to an arm sleeve.

FIG. 10 illustrates another example embodiment of a fruit stem removal apparatus. In this example embodiment the fruit stem removal apparatus 300 can include a base 302 which can be configured to be attached to an arm sleeve 350. This setup will also provide for a completely hands free use of the apparatus 300. The fruit stem removal apparatus 300 can be attached to such an arm sleeve or other similar object via rivets, nut and bolt combinations, or other equivalents means which will perform the intended function of attaching the fruit stem removal apparatus 300 to an arm sleeve or other object. Alternatively, the fruit stem removal apparatus 300 according to this example embodiment can be easily installed onto and removed from an arm sleeve or other object via fabric snaps (with one side fastened onto the base via glue, screws, bolts or rivets, and the other side being fastened to the arm sleeve). Here, when not in use the fruit stem removal apparatus 300 can be removed from the sleeve or other object to provide more comfort for the wearer of the sleeve.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A fruit stem removal apparatus, comprising:

an elongated flat base including a first end and a second end;

a single flexible blade arm attached at a first end thereof to the first end of the base such that a second end thereof extends at an angle toward the second end of the base and directly over a center of the base, the blade arm including a blade removably attached to and extending away from the second end of the flexible blade arm;

a single flexible stop block arm attached at a first end thereof to the second end of the base such that a second end thereof extends at an angle toward the first end of the base and directly over the center of the base to face the blade, the stop block arm including a stop block attached thereto to rest adjacent to and receive the second end of the blade therein when either one of or both the flexible blade arm and the flexible stop block arm is pressed downward toward the base such that the blade contacts an inner surface of the stop block.

2. The fruit stem removal apparatus according to claim 1, further comprising:

a blade mouthpiece removably attached to the second end of the flexible blade arm and including:

a groove formed therein to attachably receive the first end of the blade, and an alignment protrusion extending outward adjacent to the blade; and a stop block mouthpiece removably attached to the second end of the flexible stop block arm and disposed a predetermined distance from the blade mouthpiece such that a stem of fruit can be inserted therebetween, the stop block mouthpiece including:

an alignment groove formed therein to receive the alignment protrusion of the blade mouthpiece when either one of or both the flexible blade arm and the flexible stop block arm is pressed downward toward the base, the alignment groove having the stop block formed therein.

3. The fruit stem removal apparatus according to claim 2, wherein:

the flexible blade arm and the flexible stop block arm include a connection groove and a connection insert formed therein; and the blade mouthpiece and the stop block mouthpiece each include a groove post and an insert post to be inserted into the connection groove and connection insert of the flexible blade arm and the flexible stop block, respectively, such that after the groove post and insert post are inserted into the respective connection groove and connection insert, the blade mouthpiece and the stop block mouthpiece can be rotated to lock onto the flexible blade arm and flexible stop block arm, respectively.

4. The fruit stem removal apparatus according to claim 3, wherein the first and second ends of the elongated flat base are bent downward such that the flexible blade arm and the flexible stop block arm extend upward and toward each other when first ends thereof are connected thereto, respectively.

5. The fruit stem removal apparatus according to claim 4, wherein the base further comprises:

a stem groove formed into a first side thereof at a middle portion thereof to receive cut stems therethrough; and a vertical edge flange extending upward from a second side thereof to stop cut stems from sliding off the second side thereof.

6. The fruit stem removal apparatus according to claim 5, wherein the base further comprises:

a horizontal connection flange disposed at each side of the vertical edge flange, each horizontal connection flange including a clamp removably connected thereto to clamp to an outer perimeter of an opening of a fruit reception bag.

7. A fruit stem removal apparatus, comprising:

an elongated flat base including a first end and a second end;

a single elongated pivotal blade arm attached at a first end thereof to the first end of the base such that a second end thereof extends toward the second end of the elongated flat base and directly over a center of the base, the pivotal blade arm including a blade extending outward from the second end thereof;

a single elongated pivotal stop block arm attached at a first end thereof to the second end of the base such that a second end thereof extends toward the first end of the elongated base and directly over a center of the base to face the blade on the second end of the blade arm, the pivotal stop block arm including a stop block at the second end thereof to receive a portion of the blade therein when either one of or both the pivotal blade arm and the pivotal stop block arm is pivoted downward toward the base such that the blade will make contact with an inner surface of the stop block to cut a stem of a fruit.

8. The fruit stem removal apparatus according to claim 7, further comprising:

a first hinge to connect the first end of the base to the first end of the pivotal blade arm;

a second hinge to connect the second end of the base to the first end of the pivotal stop block arm;

a first spring disposed between a top of the base and a bottom of the pivotal blade arm and a second spring disposed between a top of the base and a bottom of the pivotal stop block arm;

at least one first arm stopper extending upward from at least one side of the base and bending above the pivotal blade arm to limit upward movement of the pivotal blade arm; and at least one second arm stopper extending upward from at least one side of the base and bending above the pivotal stop block arm to limit upward movement of the pivotal stop block arm.

9. The fruit stem removal apparatus according to claim 8, further comprising:

a brush extending from a first side of the base and disposed between the first and second arm stoppers to stop cut stems from falling off the first side of the base.

10. The fruit stem removal apparatus according to claim 8, wherein the at least one first arm stopper includes two arm stoppers, the two arm stoppers extending from opposite sides of the base, and the at least one second arm stopper includes two arm stoppers, the two arm stoppers extend from opposite sides of the base.

* * * * *